US008137435B2

(12) United States Patent
Chen

(10) Patent No.: US 8,137,435 B2
(45) Date of Patent: Mar. 20, 2012

(54) CARBON DIOXIDE RECOVERY FROM LOW CONCENTRATION SOURCES

(75) Inventor: Yudong Chen, Garnet Valley, PA (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 262 days.

(21) Appl. No.: 12/415,731

(22) Filed: Mar. 31, 2009

(65) Prior Publication Data

US 2010/0242724 A1 Sep. 30, 2010

(51) Int. Cl.
*B01D 53/22* (2006.01)
*B01D 53/047* (2006.01)
*B01D 53/62* (2006.01)
*B01D 53/053* (2006.01)

(52) U.S. Cl. .......... 95/51; 95/102; 95/139; 95/148; 96/4; 96/130; 96/134; 96/144

(58) Field of Classification Search .......... 95/45, 51, 95/96, 102, 139, 148; 96/4, 8, 9, 10, 121, 96/130, 131, 133, 134, 143, 144
See application file for complete search history.

(56) References Cited

U.S. PATENT DOCUMENTS

| 4,229,188 A | 10/1980 | Intille |
| 4,639,257 A * | 1/1987 | Duckett et al. ............. 95/51 |
| 4,783,203 A * | 11/1988 | Doshi .......................... 96/130 |
| 4,892,565 A * | 1/1990 | Schmidt et al. ............. 95/143 |
| 5,233,837 A * | 8/1993 | Callahan ...................... 95/51 |
| 5,240,472 A | 8/1993 | Sircar |
| 5,411,721 A | 5/1995 | Doshi et al. |
| 5,463,869 A | 11/1995 | Kumar et al. |
| 5,656,067 A | 8/1997 | Watson et al. |
| 5,709,733 A | 1/1998 | Hachisuka et al. |
| 5,827,351 A | 10/1998 | Prasad et al. |
| 5,917,136 A * | 6/1999 | Gaffney et al. ................ 95/139 |
| 6,309,445 B1 | 10/2001 | Gittleman et al. |
| 6,610,124 B1 | 8/2003 | Dolan et al. |
| 6,641,645 B1 | 11/2003 | Lee et al. |
| 6,648,944 B1 | 11/2003 | Baker et al. |
| 6,911,066 B2 * | 6/2005 | Monereau ..................... 95/139 |
| 7,153,344 B2 * | 12/2006 | Filippi et al. ................... 95/51 |
| 7,427,315 B2 | 9/2008 | Dolensky et al. |
| 7,449,047 B2 | 11/2008 | Backhaus et al. |
| 7,575,624 B2 * | 8/2009 | Cartwright et al. ............ 96/144 |
| 7,670,410 B2 * | 3/2010 | Saito et al. ..................... 95/139 |
| 2004/0237789 A1 | 12/2004 | Baksh et al. |

(Continued)

FOREIGN PATENT DOCUMENTS

DE  10 2009 016 015 A1 * 10/2010

(Continued)

OTHER PUBLICATIONS

Air Liquide, "A World First in Steel Production to Preserve the Environment," Press Release, Apr. 8, 2008, 1 pg.

(Continued)

*Primary Examiner* — Jason M Greene
(74) *Attorney, Agent, or Firm* — Christopher J. Cronin

(57) ABSTRACT

A system and method of purifying gaseous carbon dioxide from a gaseous mixture obtained at low pressure from a flue gas by passing the gaseous mixture through a vacuum swing adsorption unit and then a gas purification unit to produce carbon dioxide having a purity of approximately 97% by volume or more.

14 Claims, 6 Drawing Sheets

U.S. PATENT DOCUMENTS

| | | |
|---|---|---|
| 2006/0288869 A1 | 12/2006 | Warren et al. |
| 2007/0227353 A1 | 10/2007 | Kumar |
| 2007/0232706 A1 | 10/2007 | Shah et al. |
| 2008/0072752 A1 | 3/2008 | Kumar |
| 2008/0176174 A1 | 7/2008 | White et al. |
| 2009/0013870 A1 | 1/2009 | Sorensen et al. |
| 2009/0232861 A1* | 9/2009 | Wright et al. .................. 96/143 |
| 2009/0274600 A1* | 11/2009 | Jain et al. .......................... 95/51 |
| 2009/0288556 A1* | 11/2009 | Gearhart et al. .................. 95/51 |
| 2010/0236404 A1* | 9/2010 | Baker et al. ....................... 95/51 |

FOREIGN PATENT DOCUMENTS

| | | |
|---|---|---|
| EP | 0 341 879 A1 * | 11/1989 |
| EP | EP 1 078 674 | 2/2001 |
| EP | 2 210 656 A1 * | 7/2010 |
| FR | 2 872 890 | 1/2006 |
| FR | 2 872 890 A1 * | 1/2006 |
| JP | 6-99035 * | 4/1994 |

OTHER PUBLICATIONS

Chapel, et al., "Recovery of CO2 from Flue Gases: Commercial Trends," Canadian Society of Chemical Engineers Annual Meeting, Oct. 4-6, 1999, 17 pgs.

McCarthy, James E., "California's Waiver Request to Control Greenhouse Gases Under the Clean Air Act," CRS Report for Congress, Aug. 20, 2007, 19 pgs.

Webley, et al., "Recovery of Carbon Dioxide from Flue Gas Streams by Vacuum Swing Adsorption," Monash University, 2005, Abstract, 1 pg.

Zhang, Jun, "Experimental Pilot-Scale Study of Carbon Dioxide Recovery from Flue Gas Streams by Vacuum Swing Adsorption," Monash University, Nov. 3, 2005, Abstract, 1 pg.

International Search Report and Written Opinion for PCT/IB2010/051387, mailed Jul. 5, 2010.

\* cited by examiner

CARBON DIOXIDE RECOVERY FROM LOW CONCENTRATION SOURCES

BACKGROUND

The recovery of carbon dioxide from gaseous mixtures is propelled by multiple factors including the industrial carbon dioxide market, enhanced oil recovery (EOR), and greenhouse gas emissions reduction. In the United States, carbon dioxide emissions have not been federally regulated to date. In 2007, the U.S. Supreme Court ruled that the Environment Protection Agency (EPA) has the authority to regulate carbon dioxide emissions. Additionally, on Jan. 26, 2009, United States President Obama signed a Presidential Memorandum asking the EPA to review its previous denial of California's request for a waiver of a statutory prohibition on State adoption or enforcement of emission standards. California had sought the waiver to adopt limitations on greenhouse gas emissions, including carbon dioxide, from motor vehicles. As a result, carbon dioxide recovery has recently become more important to many corporations doing business in the United States.

Many have proposed methods of recovering carbon dioxide from gaseous mixtures. Some examples include the use of pressure or temperature swing adsorption (PSA or TSA) alone or in combination with membranes. U.S. Pat. No. 6,309,445 to Gittelman et al. teaches the removal of carbon dioxide from air via PSA or TSA. U.S. Pat. No. 5,411,721 to Doshi et al. teaches removal of carbon dioxide from a natural gas feedstream using the combination of a membrane and PSA. However, PSA tends to be energy intensive due to the requirement to compress the entire feed stream, rendering the process expensive and unsuitable for many applications.

Vacuum Swing Adsorption (VSA) is another method used to separate gases. Like PSA, VSA uses adsorbents to segregate certain gases in a gaseous mixture under minimal pressure according to each gas' molecular characteristics and affinity for the adsorbents. These adsorbents preferentially adsorb the target gas species at near ambient pressure. The process then utilizes a vacuum to produce a target species-rich stream and to regenerate the adsorbent material.

VSA is sometimes described as a subset of the PSA category. However, VSA differs from PSA in that PSA uses a pressurized gas feed in the separation process and typically vents to atmospheric pressures while VSA draws the gas feed through the separation process with a vacuum. Additionally, VSA operates at near-ambient pressures. Hybrid Vacuum Pressure Swing Adsorption (VPSA) systems also exist in which the gas feed is pressurized prior to the separation process, as in the PSA process, while a vacuum is used to produce the target species-rich stream and to regenerate the adsorbent material, as in the VSA process.

U.S. Pat. App. Pub. Nos. 2007/0227353, 2007/0232706, and 2008/0072752, all assigned to Praxair, Inc., utilize a VSA process to remove carbon dioxide from a synthesis gas stream formed within a steam methane reformer. However, steam methane reformers produce a high pressure emission source of about 200 to about 500 psia, or approximately 13 bar to 35 bar. Paul Webley et al. have used a VSA process to recover carbon dioxide from exhaust gases (see abstract from the American Institute of Chemical Engineer's 2005 Annual Meeting #439b). However, purity of the recovered carbon dioxide was limited to a maximum of 90% and therefore was not suitable for many applications. Low cost methods to recover and purify carbon dioxide from low pressure gaseous mixtures having a low concentration thereof are lacking.

SUMMARY

Disclosed is a relatively low cost method and system to recover carbon dioxide from low pressure gaseous mixtures having relatively low concentrations of carbon dioxide. Non-limiting examples of suitable sources from which the low pressure gaseous mixtures may be obtained include the flue gas from a fossil fuel-fired power plant, an industrial furnace, a cement kiln, or an oxy or air combustion facility, or the exhaust gas of an engine or lime kiln (hereinafter "flue gas"). Typically, the flue gas is obtained at ambient pressure. By low pressure, Applicant means approximately 1 to approximately 5 absolute atmospheres (atma), preferably from approximately 1.2 to approximately 3.5 atma, and more preferably from approximately 1.5 to approximately 2.5 atma. Typically, the concentration of carbon dioxide in the flue gas ranges from approximately 5% by volume to approximately 25% by volume, with a concentration balance of mostly nitrogen. In many cases, the flue gas contains impurities, like $O_2$, NOx, SOx, soot and fly ash. These impurities can be a problem if the resulting carbon dioxide product is used in the food and beverage industries. Therefore, a pre- or post-treatment system may be needed to remove the impurities, such as a thermal swing adsorption process. The details of suitable pre- or post-treatment technologies for removing $O_2$, $NO_x$, $SO_x$, soot, and fly ash are well known to those skilled in the art and their details need not be replicated herein.

The present recovery method and system obtains a low pressure gaseous mixture from a flue gas and passes the gaseous mixture into an adsorbent bed of a VSA unit having one or more adsorbent beds and a vacuum pump. The adsorbent beds feature a material that adsorbs carbon dioxide. A vacuum pump is used to draw a carbon dioxide-rich stream from the adsorbent beds. The carbon dioxide-rich stream may be collected in a buffer tank. From the buffer tank, the carbon dioxide-rich stream is passed through a compressor and compressed to a desired pressure. The compressed carbon dioxide-rich stream is then passed into a gas purification unit. The gas purification unit produces the carbon dioxide product and a carbon dioxide-lean stream. The carbon dioxide-lean stream is returned to the VSA unit where it may pressurize one or more of the adsorbent beds or be combined with the gaseous mixture.

By providing high quality carbon dioxide economically from either small or large scale sources, the method and system disclosed may be used in areas where conventional merchant carbon dioxide sources are not readily available.

The disclosed method and system may include one or more of the following aspects:
- the gas purification unit comprising one or more membranes.
- the gas purification unit comprising a pressure swing adsorption unit.
- flowing a portion of the carbon dioxide product to the vacuum swing adsorption unit to rinse the one or more adsorbent beds.
- the carbon dioxide-rich stream being compressed to a pressure of approximately 5 to approximately 30 bar.
- the carbon dioxide product having a purity of at least about 97% by volume.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

The method and system disclosed provide a low cost method and system to extract high purity carbon dioxide from low pressure gases containing low quantities of carbon dioxide, preferably in the range of approximately 5% by volume to approximately 25% by volume and at approximately 1 to approximately 5 atma, preferably from approximately 1.2 to approximately 3.5 atma, and more preferably from approximately 1.5 to approximately 2.5 atma.

Figure 1:
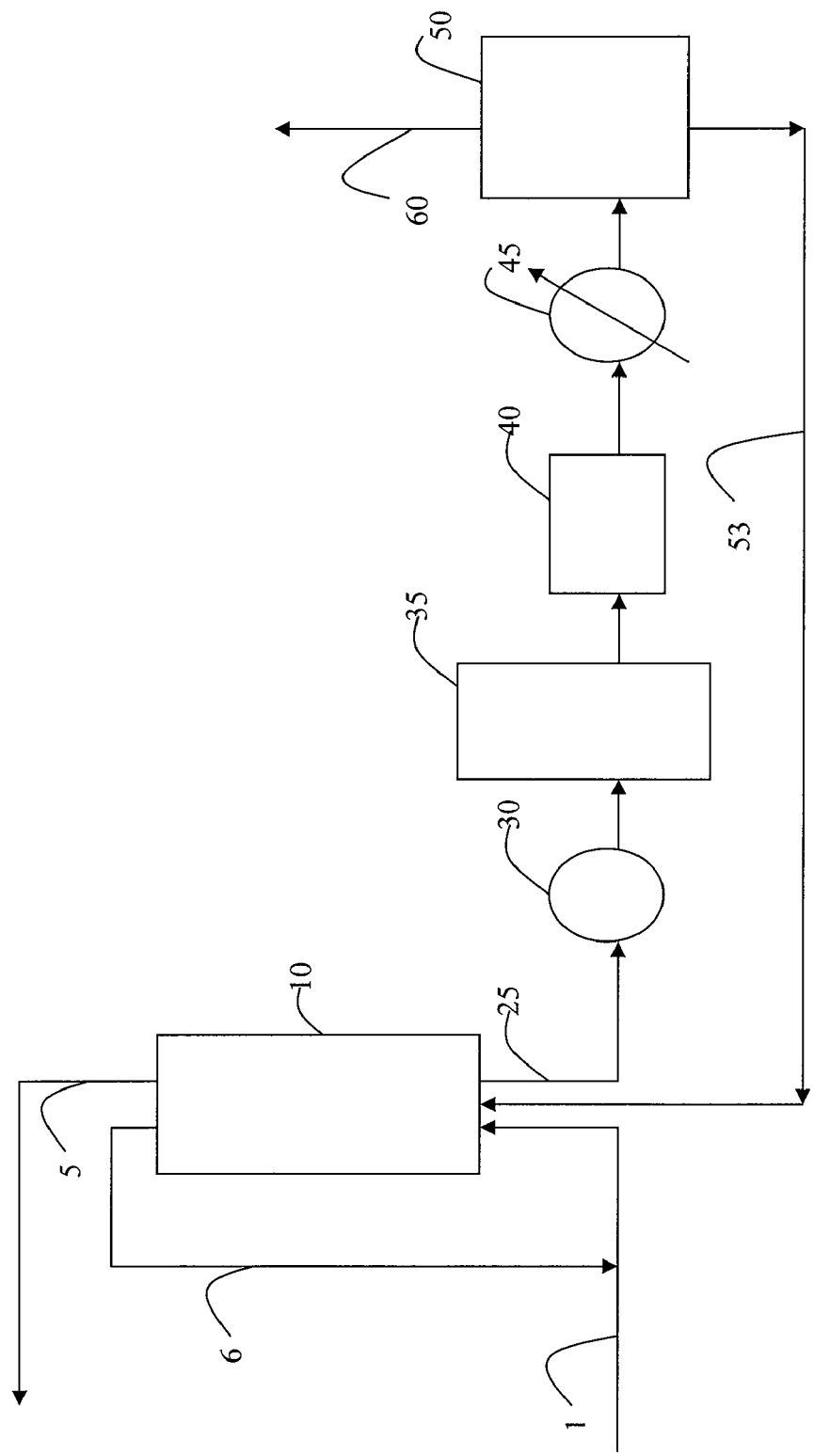
FIG. 1 illustrates a schematic of an exemplary embodiment of the system disclosed.

In the exemplary embodiment illustrated in FIG. 1, the gaseous mixture 1 enters a VSA unit 10. The VSA unit 10 has one or more adsorbent beds 11 (shown in FIGS. 2-6) containing a material that preferentially adsorbs carbon dioxide over other prevalent gases in the gaseous mixture, such as nitrogen, $NO_x$, $SO_x$, etc. The adsorbent material may be arranged in one or more layers in the adsorbent bed 11, so long as, as a whole, the layers are suitable for the preferential adsorption of carbon dioxide at low partial pressure. Examples of such materials include, but are not limited to, 13X, 5A and CaX zeolites, and metal organic frameworks (MOFs). The non-adsorbed portion of the gaseous mixture 1 passes through the VSA unit 10 unadsorbed as first non-adsorbed stream 5. First non-adsorbed stream may either be vented or utilized for additional processing. In addition to or alternatively, the non-adsorbed portion may be combined with the gaseous mixture 1 as second non-adsorbed stream 6 and thus recirculated to the VSA unit 10. After the first and/or second non-adsorbed streams 5 and/or 6 exit the VSA unit 10, a carbon dioxide-rich stream 25 is withdrawn by a vacuum pump 30 from the adsorbent bed 11 (shown in FIGS. 2-6) of the VSA unit 10. The carbon dioxide-rich stream 25 is optionally collected in a buffer tank 35.

One of ordinary skill in the art will recognize that the VSA unit 10 may employ more than one adsorbent bed 11, wherein during an adsorption phase for one bed 11, another bed 11 may under pressurization, pressure equalization, or production.

The carbon dioxide-rich stream 25 then passes through a compressor 40 and cooler 45. One of ordinary skill in the art will recognize that the compressor 40 and cooler 45 may be integrated into one unit. The compressor 40 compresses the carbon dioxide-rich stream 25 to a desired pressure for further processing by the gas purification unit 50. The cooler 45 cools the compressed carbon dioxide-rich stream to a temperature ranging from approximately ambient temperature to approximately 50° C. The carbon dioxide-rich stream 25 then passes through the gas purification unit 50, which produces a carbon dioxide product 60 and a carbon dioxide-lean stream 53. The carbon dioxide-lean stream 53 is returned to the VSA unit 10. One of ordinary skill in the art will recognize that, depending on its ultimate use, the disclosed method and system may provide a carbon dioxide product 60 having either enhanced purity or enhanced recovery. Preferably, the resulting carbon dioxide product 60 has a purity of over approximately 97% by volume and is therefore suitable for industrial applications, including, but not limited to enhanced oil recovery or processing in a liquefaction plant for production of food-grade $CO_2$ products.

The carbon dioxide-lean stream 53 has a lower carbon dioxide concentration than the carbon dioxide product 60. However, the carbon dioxide-lean stream 53 has both a carbon dioxide concentration and pressure higher than that of the gaseous mixture 1. The carbon dioxide concentration of the carbon-dioxide lean stream 53 ranges from approximately 60% by volume to approximately 90% by volume. As a result, the carbon dioxide-lean stream 53 may optionally be combined with the gaseous mixture 1 to increase the carbon dioxide partial pressure prior to the VSA process.

In a second embodiment, and as will be described in more detail with respect to FIGS. 2-6, the carbon dioxide-lean stream 53 may be used to pressurize the adsorbent beds 11 of the VSA unit 10, enriching the carbon dioxide content and pushing impurities out of the adsorbent beds 11. The term "pressurize," and variants thereof including "pressurizing," "pressurized," and the like, encompass both the high pressure rinse phase 120 and the pressurization phase 125, which will be described in more detail with respect to FIGS. 2-6. Both embodiments (i.e., combining the carbon-dioxide lean stream 53 with the gaseous mixture 1 and using the carbon dioxide-lean stream 53 to pressurize the adsorbent bed 11) provide for improved recovery of carbon dioxide and are not mutually exclusive, it being possible to perform them simultaneously on different adsorbent beds 11 in the VSA unit 10.

When the system is designed to include further processing of the carbon dioxide product 60 downstream from the gas purification unit 50, the carbon dioxide-lean stream 53 may also come from sources other than the gas purification unit 50, provided the source is at a higher-pressure and carbon dioxide concentration than the gaseous mixture 1. For example, the carbon dioxide-lean stream may originate from a carbon dioxide liquefaction column.

The gas purification unit 50 may be one or more gas separation membranes. When this type of unit 50 is selected, the carbon dioxide-rich stream 25 is preferably compressed by compressor 40 to a pressure of approximately 5 to approximately 30 bar. Suitable gas separation membranes include any gas separation membranes known in the art that preferentially permeate carbon dioxide over nitrogen. Non-limiting examples of such membranes include the membranes disclosed in U.S. Pat. Nos. 7,422,623 and 6,860,920, and 5,015,270.

Alternatively, the gas purification unit 50 may be a pressure swing adsorption unit ("PSA"). When the PSA is selected, the carbon dioxide-rich stream 25 is compressed to a pressure of approximately 5 to approximately 30 atmospheres. The pressure swing adsorption unit features one or more beds containing materials suitable for the adsorption of carbon dioxide. Examples of such materials include, but are not limited to, activated carbon, alumina, and silica gel.

The gaseous mixture 1 contains approximately 5% by volume to approximately 25% by volume carbon dioxide. As a result, the carbon dioxide-rich stream 25 produced by the VSA unit 10 is much smaller than the initial quantity of gaseous mixture 1. Therefore, the method and system disclosed utilize relatively smaller scale equipment (the vacuum pump 30 and the compressor 40) to further process the carbon dioxide-rich stream 25 than would otherwise be required to directly subject the gaseous mixture 1 to purification by pressure swing adsorption. Thus, significant cost and energy savings are realized.

FIGS. 2-6 detail five exemplary VSA processes through which each of the one or more adsorbent beds 11 in the VSA unit 10 may progress. A dotted timeline with dotted dividing bars is included in each figure to depict each phase of the cycle. In other words, FIGS. 2-6 depict the various cycles that one adsorbent bed 11 undergoes through the VSA process. The timeline is simply provided to show the progression of the adsorbent bed 11 from one phase to the next and does not represent real scaled time. So, any apparent difference in the duration of a phase is merely the result of the complexity of that phase. In other words, the more components entering or exiting an adsorbent bed 11 will result in a larger drawing and therefore the appearance of a longer duration. Thus, the timeline is not provided to depict the relative duration of time for each phase, but instead progression of the phases.

Each of the one or more adsorbent bed 11 progresses through the VSA process cycle on a different phase, so that while one adsorbent bed 11 may be in the adsorption phase 100, another adsorbent bed 11 may simultaneously be in the production phase 160. As a result, when the figures depict one phase being utilized in conjunction with another phase, for example with respect to the equalization phases 140 and 180 of FIGS. 3, 4, & 6, these uses are between two different adsorbent beds 11 at different phases in their respective cycles, not within the cycle of a single adsorbent bed 11. In other words, two separate adsorbent beds 11 communicate, with one adsorbent bed 11 undergoing the de-pressurizing equalization phase 140 and the other adsorbent bed 11 simultaneously undergoing the re-pressurizing equalization phase 180.

Figure 2:
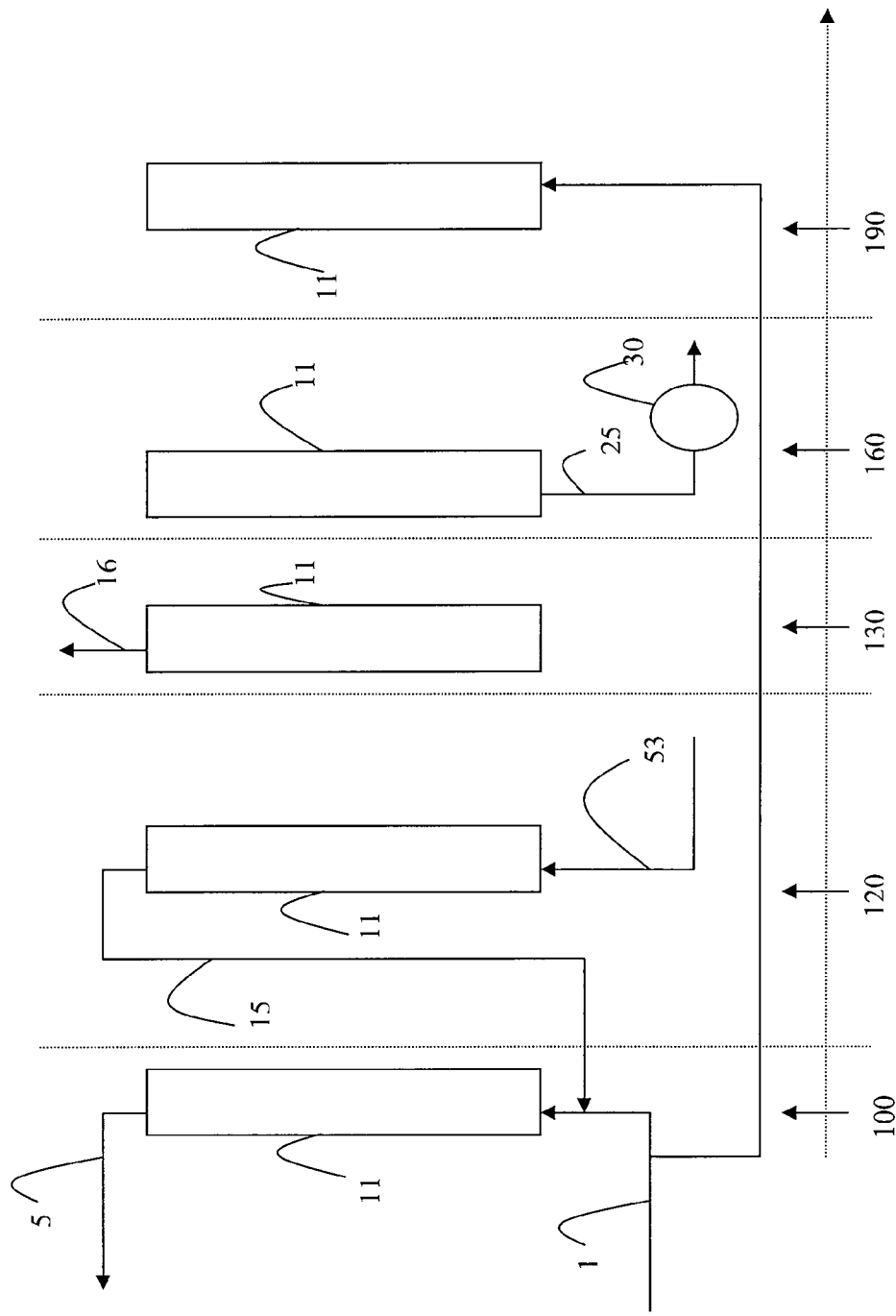
FIG. 2 illustrates a schematic of various phases of a cycle through which each of the one or more adsorbent beds of the VSA unit may progress which includes a de-pressurization phase following the high pressure rinse phase.

FIG. 2 illustrates one VSA process through which each of the one or more adsorbent beds 11 in the VSA unit 10 may progress. In the adsorption phase 100, the gaseous mixture 1 is directed into the adsorbent bed 11. Carbon dioxide is preferentially adsorbed into the adsorbent bed 11 while the first non-adsorbed stream 5 proceeds unadsorbed.

In the high pressure rinse phase 120, the carbon dioxide-lean stream 53 from the gas purification unit 50 is used to pressurize the adsorbent bed 11. The pressure of the adsorbent bed 11 is increased depending on the available quantity of the carbon dioxide-lean stream 53. As the carbon dioxide-lean stream 53 has a higher partial pressure of carbon dioxide than the gaseous mixture 1, an impure stream 15 containing such gases as nitrogen and NOx that may have been adsorbed or stored in the adsorbent bed 11 during the adsorption phase 100 are pushed from the adsorbent bed 11 by the carbon dioxide in the carbon dioxide-lean stream 53. The impure stream 15 may be combined with the gaseous mixture 1 and returned to the adsorption phase 100 like second non-adsorbed stream 6 or vented or utilized in a separate procedure like first non-adsorbed stream 5. Notwithstanding the release of impure stream 15, the pressure in the adsorbent bed 11 is higher after the high pressure rinse phase 120 than it was after the adsorption phase 100.

In the de-pressurization phase 130, the pressure of the adsorbent bed 11 is returned to a specific pressure (e.g. ambient) while simultaneously withdrawing a second impure stream 16. The second impure stream 16 typically contains mostly small quantities of nitrogen. As a result, in this embodiment, the second impure stream 16 is vented to the atmosphere. One of ordinary skill in the art would recognize that the second impure stream 16 may also be further utilized in another process. By removing the second impure stream 16 from the adsorbent bed 11, the de-pressurization phase 130 improves the quality of the carbon dioxide in the adsorbent bed 11. The de-pressurization phase 130 precedes the production phase 160, and therefore prepares the adsorbent bed 11 for further depressurization by the vacuum pump 30. As a result the de-pressurization phase 130 prevents shock to the vacuum pump 30 that may result from starting a vacuum pump 30 under pressure and therefore extends the operating life of the vacuum pump 30.

In the production phase 160, the vacuum pump 30 is used to withdraw a carbon dioxide-rich stream 25 from the adsorbent bed 11. By removing the carbon dioxide-rich stream 25, the production phase 160 cleans the adsorbent bed 11 in preparation for the next cycle.

In the re-pressurization phase 190, the adsorbent bed 11 is repressurized using the gaseous mixture 1. Some adsorbents, such as zeolite 13X, exhibit especially good selectivity of carbon dioxide over nitrogen under low pressure. This selectivity decreases slightly as pressure increases. As the re-pressurizaton phase 190 follows the production phase 160 in which the adsorbent bed 11 was under vacuum, the adsorbent bed 11 adsorbs more carbon dioxide from the gaseous mixture 1 than it does during the adsorption phase 100.

Figure 3:
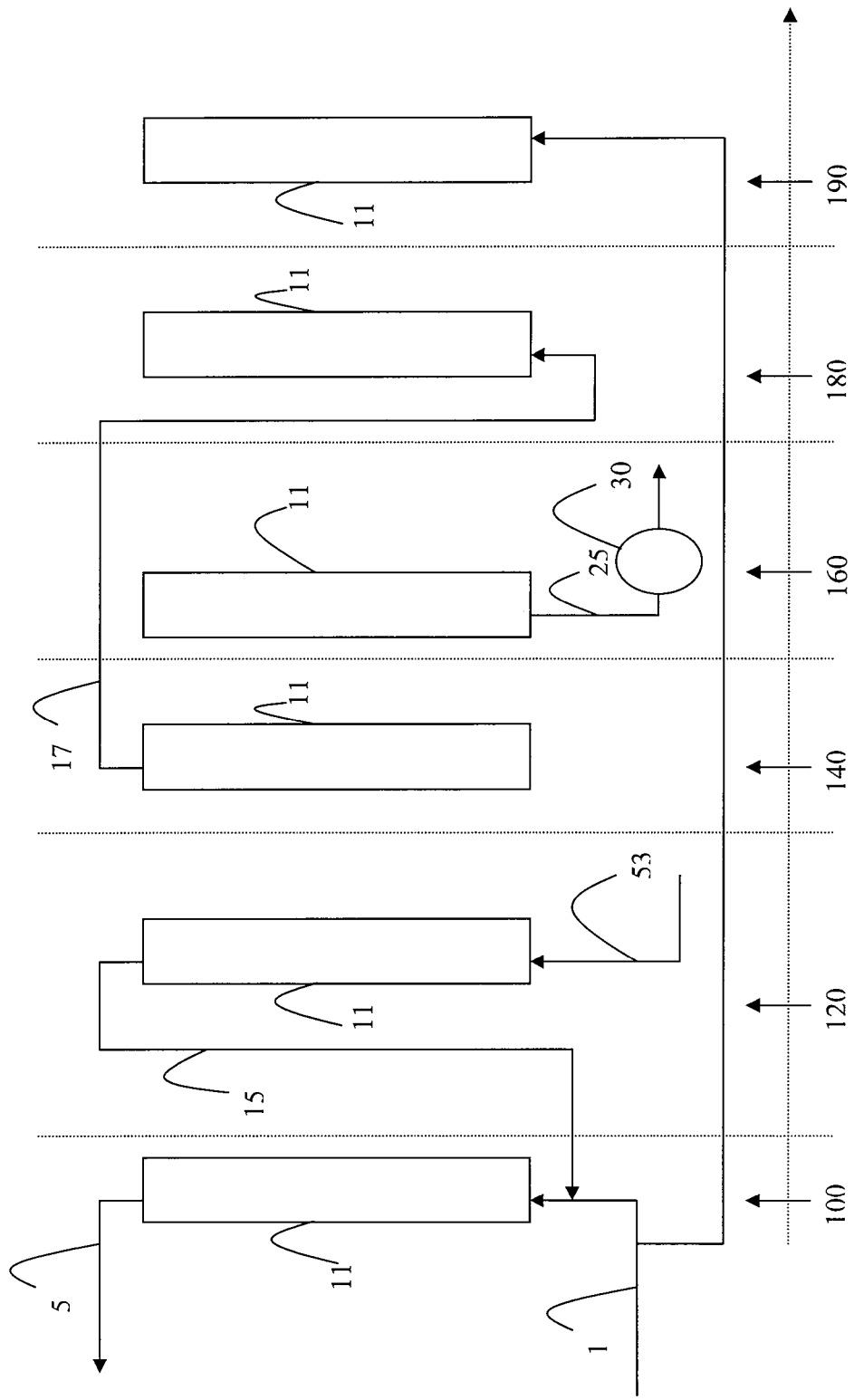
FIG. 3 illustrates another schematic of various phases of a cycle through which each of the one or more adsorbent beds may progress in which the de-pressurization phase of FIG. 2 is replaced by two equalization phases.

FIG. 3 illustrates a slight modification of the process detailed in FIG. 2. Rather than sending the second impure stream 16 to the atmosphere in the de-pressurization phase 130, the de-pressurization phase 130 is replaced by equalization phases 140 and 180. In equalization phase 140, the pressure in the adsorbent bed 11 is decreased by opening communication with a second adsorbent bed 11 at vacuum pressure, which simultaneously increases the pressure in the second adsorbent bed 11. This communication also results in some feed transfer 17 to the second adsorbent bed 11. In the VSA process of FIG. 3, the assumption is made that a sufficient quantity of the impure stream 15 has been removed in the high pressure rinse step 120 and that the second impure stream 16 vented in the depressurization step 130 of FIG. 2 may contain some carbon dioxide. The equalization steps 140 and 180 provide a chance to recover that carbon dioxide. Therefore, while de-pressurization step 130 improves the quality of carbon dioxide in the adsorbent bed 11 by removing the second impure stream 16, equalization phases 140 and 180 provide for improved carbon dioxide recovery.

As with re-pressurization phase 190, the selectivity of the adsorbent bed 11 for carbon dioxide improves at lower pressures for some adsorbent materials. Therefore, in equalization phase 180, the initial low pressure of adsorbent bed 11 improves the adsorption of carbon dioxide from the feed transfer 17, resulting in improved quality and recovery of carbon dioxide. Equalization step 180 may not, however, bring the adsorbent bed 11 back to ambient pressure in some cases, so re-pressurization step 190 remains part of the process.

FIG. 3 intentionally depicts the feed transfer 17 exiting the adsorbent bed 11 from the top in equalization phase 140 and entering the bottom in equalization phase 180. As carbon dioxide is preferentially adsorbed, it saturates the adsorbent near the inlet while nitrogen proceeds unadsorbed toward the top of the adsorbent bed 11. As a result, a wave front develops in the adsorbent bed 11 between an area having high carbon dioxide concentration and an area having high nitrogen concentration. Introducing the feed transfer 17 into the bottom of the adsorbent bed 11 helps to increase the area having high carbon dioxide concentration and thereby move the wave front towards the outlet of the adsorbent bed 11, resulting in a larger concentration of carbon dioxide adsorbed in the adsorbent bed 11 and therefore improved recovery.

The adsorbent beds 11 in FIGS. 2-6 are depicted having a vertical orientation. One of ordinary skill in the art would recognize that, depending on the space constraints of the intended location for the system, the adsorbent beds 11 may also be oriented horizontally without detracting from the teachings of the instant invention, provided that the gas flow proceeds from the bottom of the adsorbent bed 11 to top in either orientation.

The equalization steps 140 and 180 permit increased efficiency of the VSA process by utilizing the pressure imparted to the adsorbent bed 11 by the carbon dioxide-lean stream 53 to partially re-pressurize the adsorbent bed 11 after the production phase 160. Similar to the de-pressurization step 130 of FIG. 2, the depressurization of equalization step 140 protects the vacuum pump 30 from shock. Finally, by advancing the carbon dioxide/nitrogen wave front, the equalization steps 140 and 180 improve the quality of the adsorbent bed 11.

Figure 4:
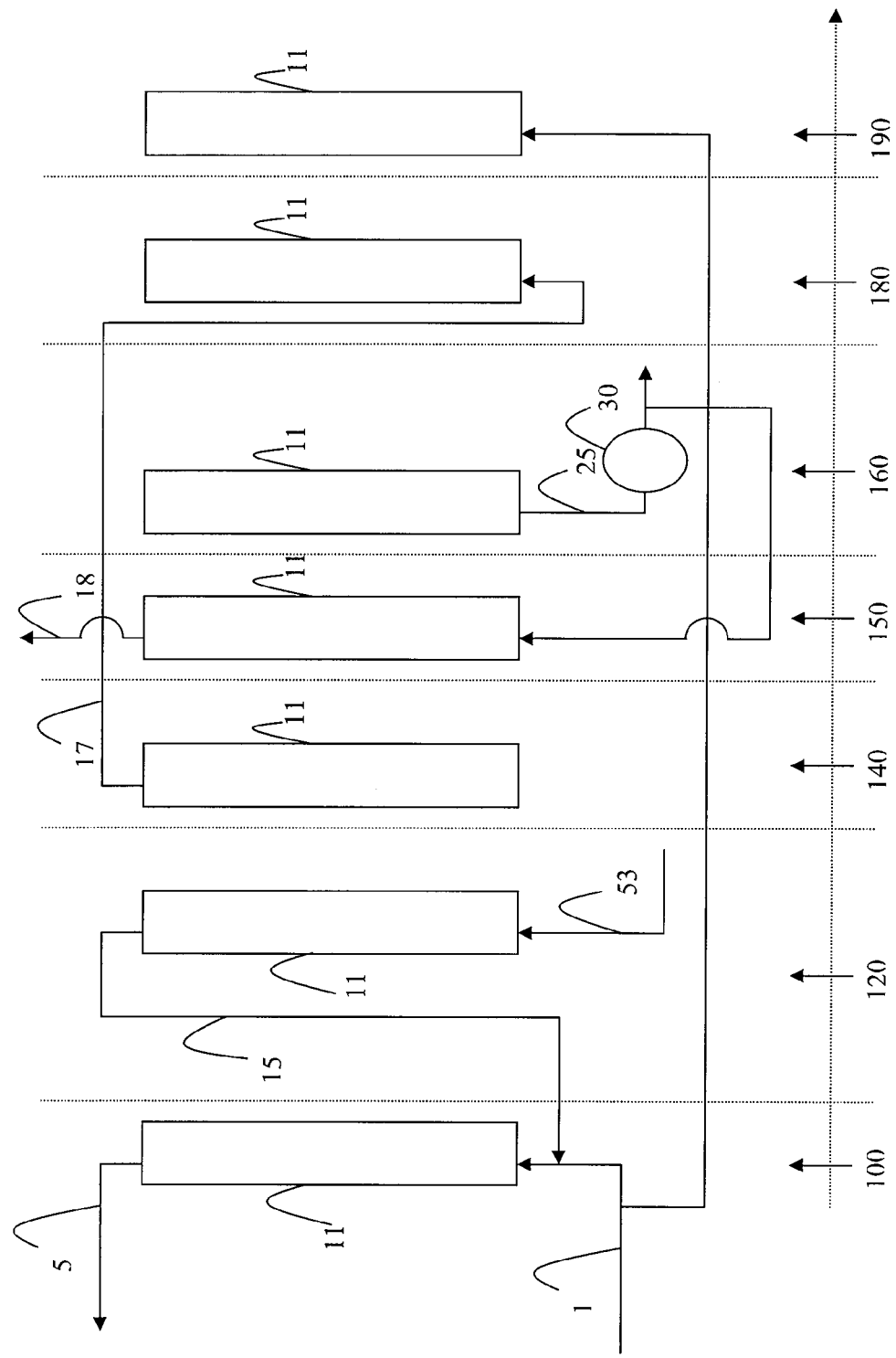
FIG. 4 illustrates another schematic of various phases of a cycle through which each of the one or more adsorbent beds may progress which adds a low pressure rinse phase to the cycle of FIG. 3.

FIG. 4 expands upon the process illustrated in FIG. 3 by adding a low pressure rinse phase 150 prior to the production phase 160. The low pressure rinse phase 150 utilizes the carbon dioxide-rich stream 25 produced by the VSA process to provide a second rinse of the adsorbent bed 11. The concentration of carbon dioxide in the carbon dioxide-rich stream 25 is higher than that of the carbon dioxide-lean stream 53. As with the equalization steps 140 and 180, adding the carbon dioxide-rich stream 25 into the bottom of the adsorbent bed 11 advances the wave front between the carbon dioxide and nitrogen, resulting in a larger concentration of carbon dioxide and therefore a higher quality product. A third impure stream 18 containing such gases as nitrogen and NOx that may have been adsorbed or stored in the adsorbent bed 11 during the adsorption phase 100 and the high pressure rinse phase 120 are pushed from the adsorbent bed 11 by the carbon dioxide in the carbon dioxide-rich stream 25 and either recirculated to the VSA unit 10 like second non-adsorbed stream 6 or vented or utilized in a separate procedure like first non-adsorbed stream 5.

Figure 5:
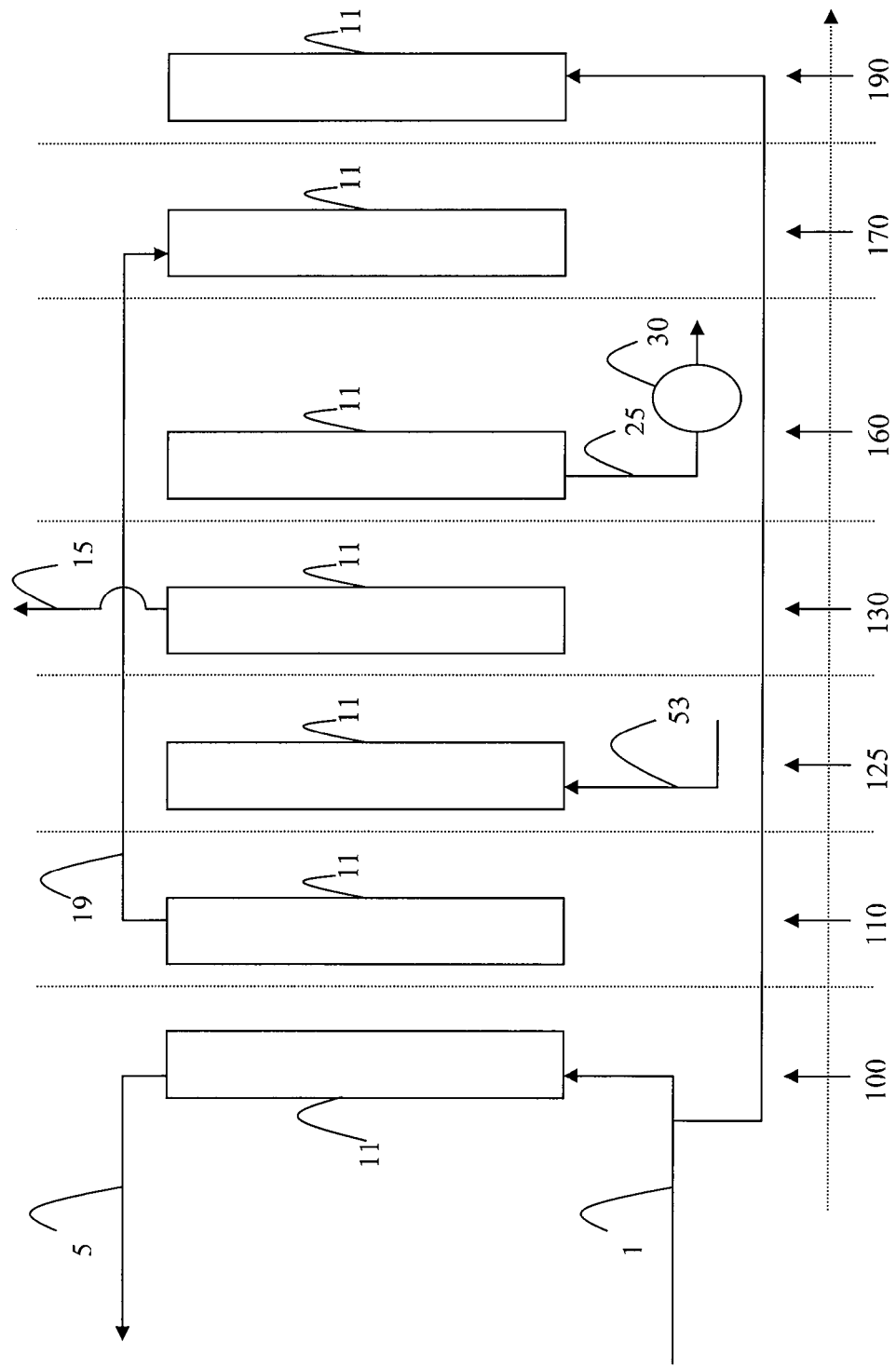
FIG. 5 illustrates another schematic of various phases of a cycle through which each of the one or more adsorbent beds may progress which replaces the high pressure rinse phase of FIG. 2 with a pressurization phase and adds two equalization phases at different points in the cycle than depicted in FIGS. 3 & 4.

In FIG. 5, the equalization stages 140 and 180 of FIGS. 3 & 4 are replaced by equalization stages 110 and 170, the high pressure rinse phase 120 is replaced by a pressurization phase 125, and the de-pressurization step 130 of FIG. 2 returns. As equalization stages 110 and 170 occur earlier in this VSA process, the adsorbent bed 11 contains more nitrogen, which is communicated through feed transfer 19. Therefore, in contrast to the equalization stages 140 and 180, the communication between adsorbent beds 11 in equalization stage 110 and 170 occurs top to top. Additionally, as equalization stage 170 occurs at low pressure, the adsorbent bed 11 has a higher selectivity for carbon dioxide, which improves the adsorption of carbon dioxide from the feed transfer 19. As with equalization stages 140 and 180, equalization stages 110 and 170 help to improve the carbon dioxide recovery while simultaneously reducing the cost and energy consumption of the process Like the high pressure rinse phase 120 of FIGS. 2-4, the pressurization phase 125 uses the carbon dioxide-lean stream 53 to pressurize the adsorbent bed 11. However, the pressurization phase 125 does not provide for removal and recirculation of the impure stream 15 as in the high pressure rinse phase 120. Therefore, de-pressurization step 130 returns but this time to provide for the removal of impure stream 15 by either recirculation to the VSA unit 10 like second non-adsorbed stream 6 or by venting or utilization in a separate procedure like first non-adsorbed stream 5.

Figure 6:
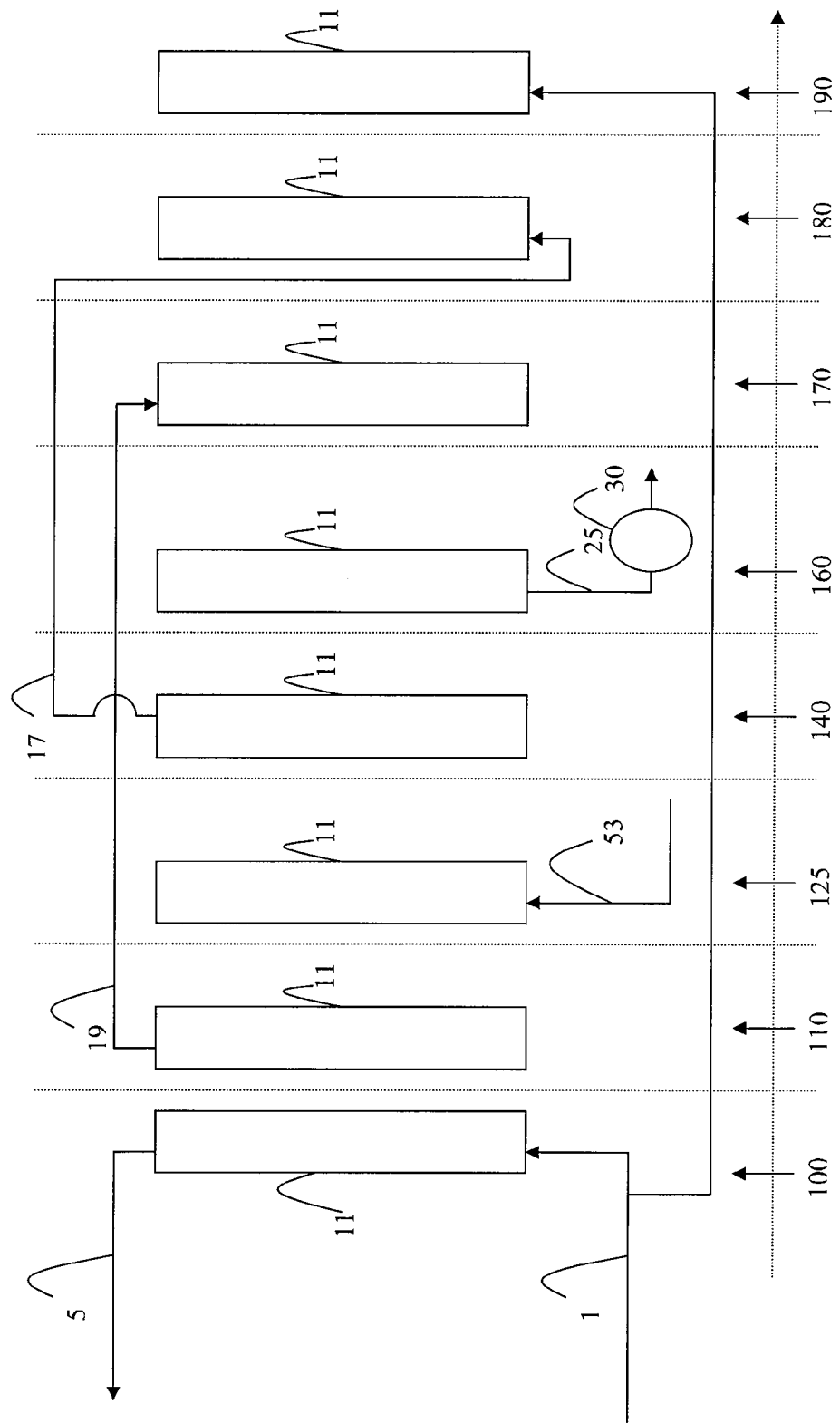
FIG. 6 illustrates another schematic of various phases of a cycle through which each of the one or more adsorbent beds may progress in which the de-pressurization phase of FIG. 5 is replaced by an additional two equalization phases.

In FIG. 6, the equalization stages 140 and 180 are once again added to replace the de-pressurization step 130 of the embodiment of FIG. 5. As discussed with reference to FIG. 4, substitution of the de-pressurization phase 130 by equalization steps 140 and 180 helps to prevent waste and improve recovery.

In each of the embodiments depicted in FIGS. 2-6, the carbon dioxide-lean stream 53 is used to pressurize the adsorbent bed 11. This step helps to improve the carbon dioxide recovery while simultaneously reducing the cost and energy consumption of the process. One of ordinary skill in the art will recognize that the disclosed method and system is not limited to these embodiments and that alternate VSA processes may be utilized without deviating from the scope of the invention, so long as a pressurization phase with a carbon dioxide stream having higher quality and higher pressure than the gaseous mixture 1 is included.

EXAMPLES

Table 1 provides the simulation results of carbon dioxide recovery from three separate gaseous mixture 1 streams containing either 15% by volume or 10% by volume carbon dioxide with balance nitrogen at an initial feed pressure of 1.2 bar. The simulation was performed using the Adsim software program made by Aspen Technology, Inc. for the VSA process, a proprietary software program for the membrane process, and incorporating the results of both into the Hysis software program from Aspen Technology, Inc. for the entire method. The system of FIG. 1 utilizing the VSA process of FIG. 5 detail the processes utilized in these examples, with the VSA unit 10 having four adsorbent beds 11 containing the 13X zeolite adsorbent and the gas purification unit 50 utilizing the G5 hollow fiber gas separation membranes sold by Medal L.P., a wholly owned subsidiary of Air Liquide Advanced Technologies U.S. LLC.

TABLE 1

| | | $CO_2$ VSA | | | | | | |
|---|---|---|---|---|---|---|---|---|
| | | | $CO_2$-Rich | $CO_2$-Rich | Overall Performance | | | |
| Gaseous mixture 1 | $CO_2$ Lean Stream 53 | VAC 30 Power* | Stream 25 Purity | Stream 25 Recov | Comp 40 Press | Comp 40 Power* | $CO_2$ Product 60 Purity | $CO_2$ Product 60 Recov |
| 15% by volume $CO_2$ - 1.5 bar | 80% by volume $CO_2$ - 8.8 bar | 8.01 kw/(t/d) | 82.8% by volume | 89.2% by volume | 8.9 bar | 8.0 kw/(t/d) | 98.11% by volume | 75.60% by volume |
| 15% by volume $CO_2$ - 2.0 bar | 80% by volume $CO_2$ - 7.9 bar | 9.31 kw/(t/d) | 87.9% by volume | 77.8% by volume | 8.0 bar | 8.19 kw/(t/d) | 98.65% by volume | 71.44% by volume |

TABLE 1-continued

| | | CO$_2$ VSA | | | | | | |
|---|---|---|---|---|---|---|---|---|
| | | | CO$_2$-Rich | CO$_2$-Rich | Overall Performance | | | |
| Gaseous mixture 1 | CO$_2$ Lean Stream 53 | VAC 30 Power* | Stream 25 Purity | Stream 25 Recov | Comp 40 Press | Comp 40 Power* | CO$_2$ Product 60 Purity | CO$_2$ Product 60 Recov |
| 10% by volume CO$_2$ - 2.5 bar | 70% by volume CO$_2$ - 3.5 bar | 13.58 kw/(t/d) | 83.9% by volume | 86.5% by volume | 3.6 Bar | 6.41 kw/(t/d) | 97.80% by volume | 57.88% by volume |

*kw/(t/d) = kilowatt/ton/day

In order to compensate for the overall pressure loss throughout the process, the simulation included a blower to compress the gaseous mixture 1 to the different pressure levels indicated in the first column prior to the VSA process. As expected, the higher pressure resulted in higher purity carbon dioxide-rich streams 25 in the VSA process (see CO$_2$—Rich Stream 25 Purity column), but also required more power to process (see VAC 30 Power column). However, even with the difference in carbon dioxide purity resulting from the higher pressure feed in the VSA process, the difference in overall purity of the final carbon dioxide product 60 is less than one percent (see CO$_2$ Product 60 Purity column).

Due to the multiple software programs utilized to perform the simulation, only approximately eighty percent of the calculated carbon dioxide lean stream 53 flow rate from the proprietary software program for the membrane process was entered into the VSA calculation. One of ordinary skill in the art will recognize that the system performance will improve when the carbon dioxide-lean stream 53 has a higher flow rate with which to pressurize the adsorbent beds 11.

The mass balance results of the VSA simulation for the gaseous mixture 1 pressurized to 1.5 bar in table 1 are provided in table 2.

TABLE 2

| | GASEOUS MIXTURE 1 | CO$_2$-RICH STREAM 25 | FIRST NON-ADSORBED STREAM 5 | SECOND NON-ADSORBED STREAM 6 | CO$_2$-LEAN STREAM 53 |
|---|---|---|---|---|---|
| Stream: | | | | | |
| Specific flow (cc/cc bed/hr): | 135 | 52 | 112 | 5 | 34 |
| Average composition forward: | | | | | |
| CO$_2$ (mol/mol): | 0.15 | 0.827934 | 0.035969 | 0.035306 | 0.8 |
| N$_2$ (mol/mol): | 0.85 | 0.172066 | 0.964031 | 0.964694 | 0.2 |

In the VSA process detailed in table 2, a gaseous mixture 1 having 15% by volume carbon dioxide and 85% by volume nitrogen and a carbon-dioxide lean stream 53 having 80% by volume carbon dioxide and 20% by volume nitrogen produce a first non-adsorbed stream 5 having over 96% by volume nitrogen and less than 4% by volume carbon dioxide and a carbon-dioxide rich stream 25 having approximately 83% by volume carbon dioxide and approximately 17% by volume nitrogen.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of purifying gaseous carbon dioxide from a gaseous mixture comprising 5% to 25% by volume carbon dioxide, said method comprising
   (a) obtaining a gaseous mixture from a flue gas at a low pressure of 1 to 5 atmospheres absolute;
   (b) flowing the gaseous mixture into an adsorbent bed of a vacuum swing adsorption unit having one or more adsorbent beds in which carbon dioxide is adsorbed;
   (c) using a vacuum pump to draw a carbon dioxide-rich stream from the adsorbent beds;
   (d) directing the carbon dioxide-rich stream through a compressor to produce a compressed carbon dioxide-rich stream;
   (e) flowing the compressed carbon dioxide-rich stream into a gas purification unit to produce a carbon dioxide product and a carbon dioxide-lean stream, the gas purification unit comprising at least one gas separation membrane; and
   (f) returning the carbon dioxide-lean stream to the vacuum swing adsorption unit.

2. The method of claim 1, further comprising, prior to step (d), collecting the carbon dioxide-rich stream in a buffer tank.

3. The method of claim 1, wherein the carbon dioxide-lean stream returned to the vacuum swing adsorption unit pressurizes the one or more adsorbent beds in step (b).

4. The method of claim 1, wherein the carbon dioxide-lean stream returned to the vacuum swing adsorption unit combines with the gaseous mixture.

5. The method of claim 1, further comprising: (g) flowing a portion of the carbon dioxide product to the vacuum swing adsorption unit to rinse the one or more adsorbent beds.

6. The method of claim 1, wherein the gaseous mixture comprises a mixture of carbon dioxide and nitrogen.

7. The method of claim 1, wherein the gaseous mixture is at a pressure of approximately 1.5 to approximately 2.5 absolute atmospheres.

8. The method of claim 1, further comprising the step of obtaining the flue gas from a fossil fuel-fired power plant, an industrial furnace, a cement kiln, an oxy or air combustion facility, the exhaust of an engine, or the exhaust of a lime kiln.

9. The method of claim 1, wherein, in step d, the carbon dioxide-rich stream is compressed to a pressure of approximately 5 to approximately 30 bar.

10. The method of claim 1, wherein the carbon dioxide product has a purity of at least about 97% by volume.

11. A carbon dioxide purification system for recovering carbon dioxide from low pressure gaseous mixtures having low concentrations of carbon dioxide comprising:
- a gaseous mixture obtained from a flue gas, wherein the gaseous mixture contains approximately 5% by volume to approximately 25% by volume carbon dioxide at a pressure of approximately 1 to approximately 5 absolute atmospheres;
- a vacuum swing adsorption unit adapted to receive the gaseous mixture having one or more adsorbent beds in which carbon dioxide is preferentially adsorbed and a vacuum pump adapted to withdraw a carbon dioxide-rich stream from the adsorbent beds;
- a gas purification unit adapted to receive the carbon dioxide-rich stream from the vacuum pump and separate the carbon dioxide-rich stream into a carbon dioxide product and a carbon dioxide-lean stream from the carbon dioxide-rich stream, the gas purification unit comprising at least one gas separation membrane; and
- a conduit fluidly communicating between the gas purification unit and the vacuum swing adsorption unit being adapted to direct a portion of the carbon dioxide-lean stream to the vacuum swing adsorption unit.

12. The system of claim 11, wherein the conduit directs the carbon dioxide-lean stream to an inlet of the vacuum swing adsorption unit to combine with the gaseous mixture.

13. The system of claim 11, wherein the conduit directs the carbon dioxide-lean stream to the one or more adsorbent beds of the vacuum swing adsorption unit to pressurize the one or more adsorbent beds.

14. The system of claim 13, wherein the conduit directs the carbon dioxide-lean stream to the one or more adsorbent beds of the vacuum swing adsorption unit to rinse the one or more adsorbent beds.

* * * * *